Nov. 12, 1940.    H. BECKER ET AL    2,221,568
ROLL FILM CAMERA
Filed Oct. 27, 1937    4 Sheets-Sheet 1
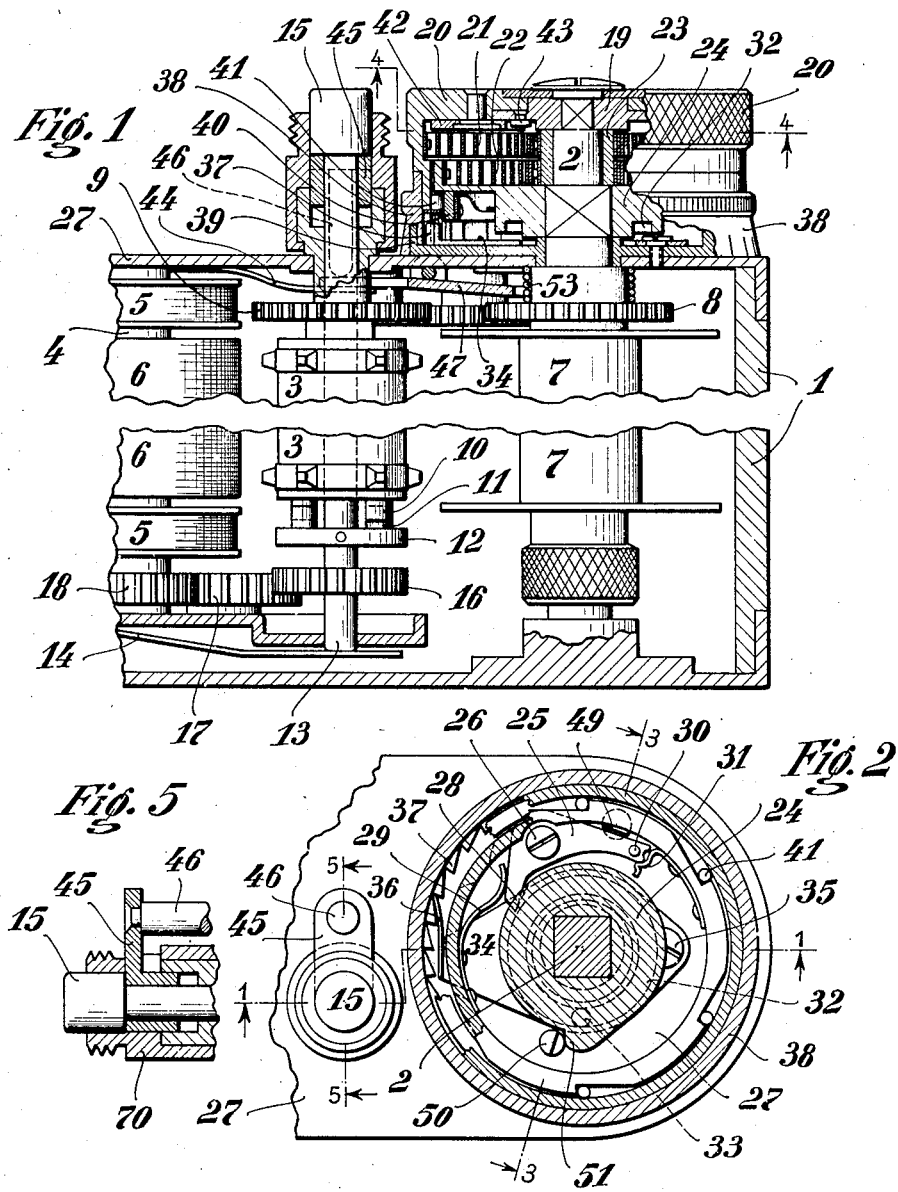
INVENTORS
Helmut Becker, Heinrich Broschke,
BY  Erich Filsinger.
Ivan E. A. Konigsberg
ATTORNEY

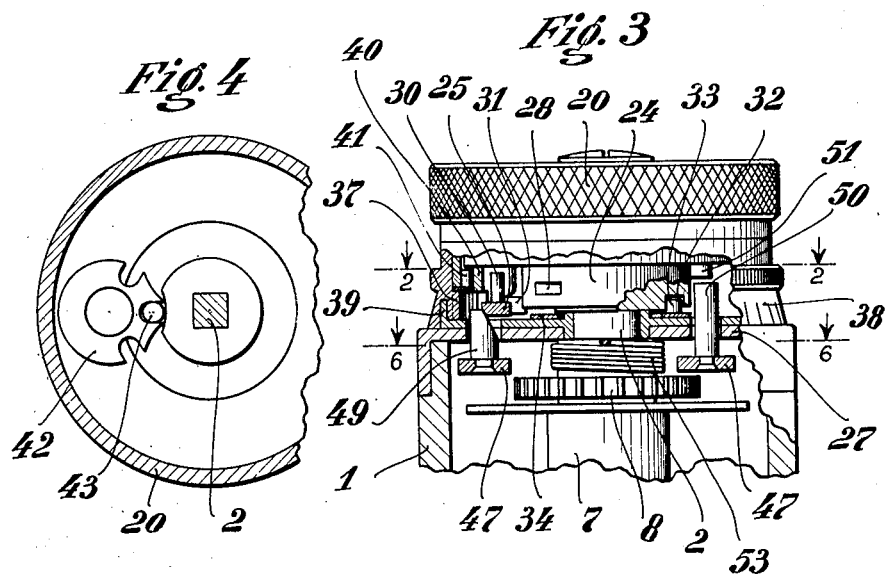
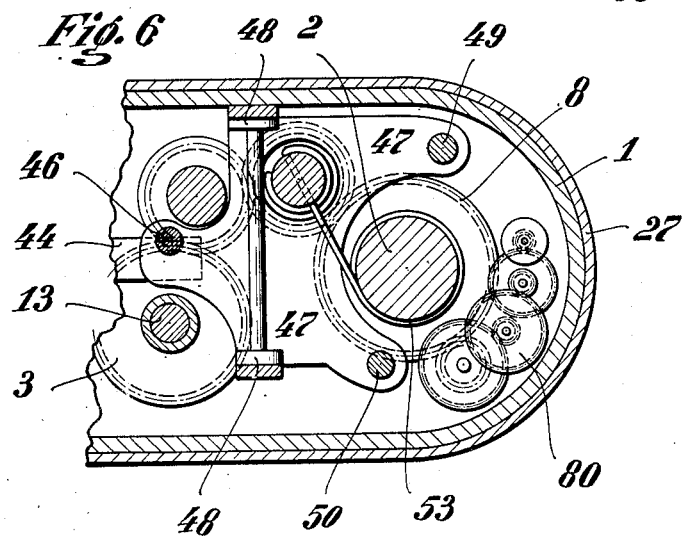

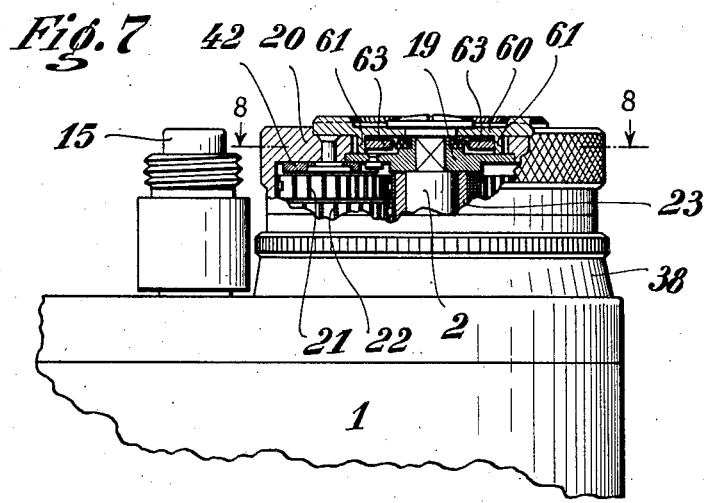
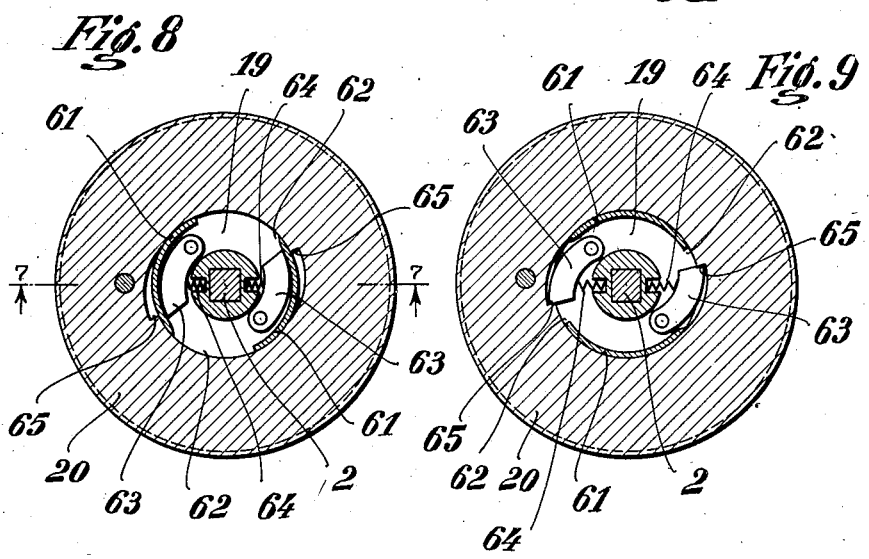

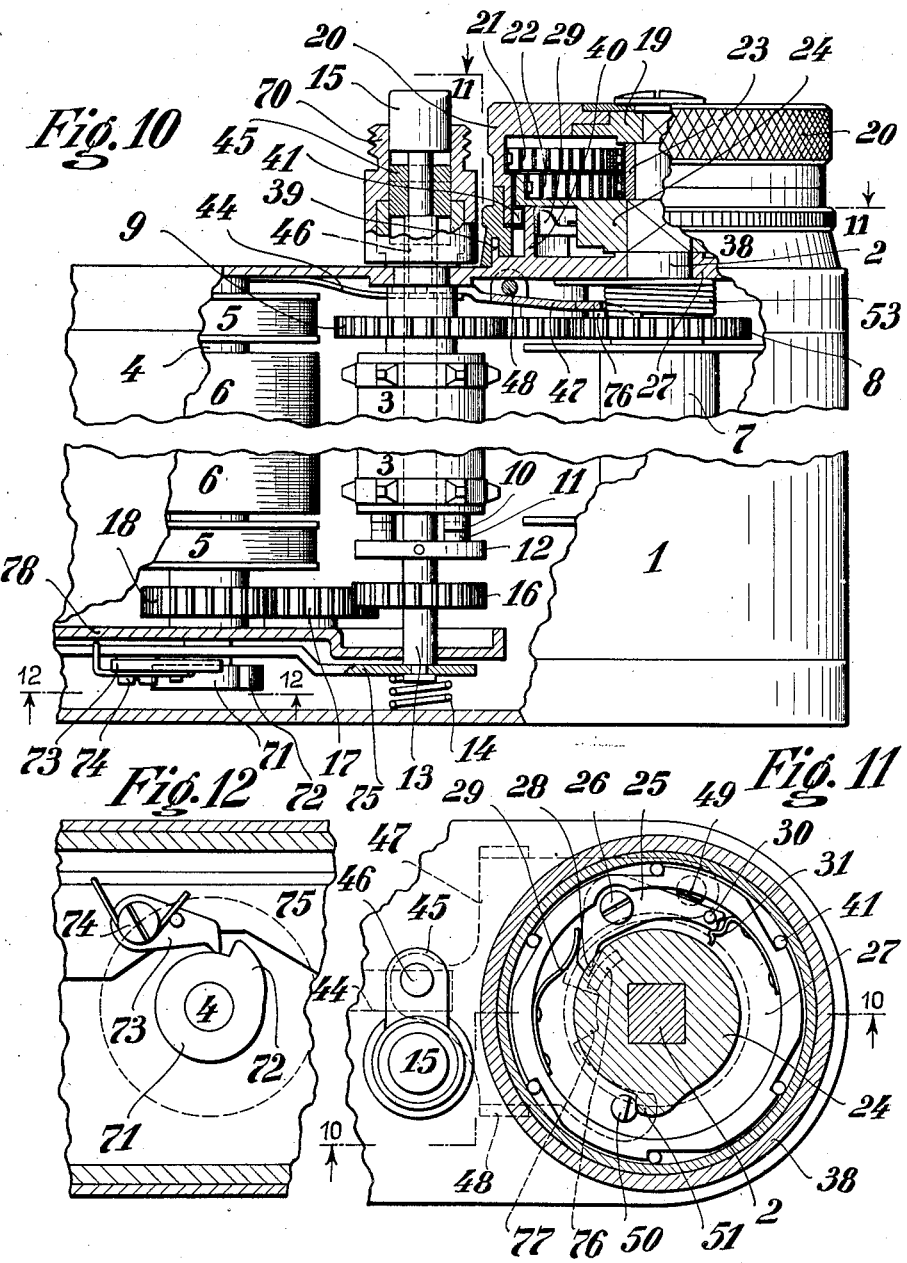

Patented Nov. 12, 1940

2,221,568

UNITED STATES PATENT OFFICE 2,221,568

ROLL FILM CAMERA

Helmut Becker, Heinrich Broschke, and Erich Filsinger, Wetzlar, Germany, assignors, by mesne assignments, to Frank Dumar, Lausanne, Switzerland Application October 27, 1937, Serial No. 171,232
In Germany November 3, 1936

3 Claims. (Cl. 95—57)

This invention relates to improvements in roll film cameras with spring winding mechanism. The object of the invention is to provide such a camera in which the spring winding mechanism is compactly built into the camera and is free from knobs, handles and other more or less cumbersome elements which in prior structures are required for operating the camera. Another object is to provide means for connecting and disconnecting the spring winding mechanism from the camera mechanism so that the latter may be operated in the usual manner by hand. Another object is to construct the spring winding mechanism in the same place in the camera which contains the usual winding knob. Another object is to provide means for delaying the opening of the shutter to compensate for the difference in speed of the shutter curtains due to the overlapping of their edges and to compensate for possible differences in the operating speeds of the spring winding mechanism and the shutter mechanism. Other objects will appear as this specification proceeds.

Accordingly the invention is embodied in a camera spring winding mechanism arranged and constructed as hereinafter set forth and as illustrated in the accompanying drawings in which Fig. 1 is a vertical sectional view of the camera and the winding mechanism taken substantially on the line 1—1 of Fig. 2 with parts removed and broken away.

Fig. 2 is a sectional plan view with parts removed and broken away and taken substantially on the line 2—2 of Fig. 3.

Fig. 3 is a sectional view taken on the line 3—3 of Fig. 2.

Fig. 4 is a detail sectional view on line 4—4 of Fig. 1.

Fig. 5 is a detail sectional view on line 5—5 of Fig. 2.

Fig. 6 is a sectional plan view on line 6—6 of Fig. 3 with parts removed.

Fig. 7 is a view partly in section and partly in elevation showing the mechanism for disconnecting the spring winding mechanism, the sectioned part being taken on line 7—7 of Fig. 8.

Fig. 8 is a sectional plan view taken on the line 8—8 of Fig. 7.

Fig. 9 is a view similar to Fig. 8 but showing the parts in a different position.

Fig. 10 is a view similar to Fig. 1 but includes the means for delaying the opening of the shutter, the sectioned portion being taken on the line 10—10 of Fig. 11.

Fig. 11 is a sectional view on line 11—11 of Fig. 10.

Fig. 12 is a sectional detail view of parts in Fig. 10 taken on line 12—12 thereof.

Referring to Figs. 1 to 6, the reference numeral 1 denotes the camera in which are located the shutter winding up shaft 2, the film transport roller 3 and the curtains shaft 4. The latter supports the ribbons drums 5, 5 for the first shutter curtain and the curtains roller 6 for the second shutter curtain. The shaft 2 supports the winding up film spool 7 and carries a gear 8 which is in driving connection with a gear 9 on the film roller 3. The latter carries clutch members 10 which engage lower clutch members 11 on a clutch plate 12. The latter is fast on a shutter release shaft 13 which extends upwards through the film roller 3. Springs 14 and 44 keep the clutch members in engagement. A shutter release 15 serves to depress the shaft 13 to disconnect the clutch members whereupon the shutter is opened in the usual manner and the film exposed. After exposure the winding up shaft 2 is rotated to rewind the shutter and wind up the film upon the spool 7, the release shaft 13 being in driving connection with the curtains roller shaft 4 by gears 16, 17 and 18. A more detailed description of the construction and operation of the above mentioned parts is not deemed necessary, the same being well known in the art.

In the present instance the winding up shaft 2 is automatically operated by means of a spring winding mechanism to wind up the shutter and the film between exposures. This mechanism will now be described. The winding up shaft 2 carries at the top a bearing 19 upon which a spring winding knob 20 is rotatably supported. The knob serves to wind up two springs 21 and 22. The outer winding of the spring 21 is secured to the knob. The inner windings of the both springs are secured to a sleeve 23 loose on the shaft 2. The outer winding of the lower spring 22 is secured to a cam plate 24 fast on the shaft 2. The cam plate 24, see Figs. 2 and 3 is prevented from rotation in one direction by a pawl 25 pivoted at 26 on the top camera plate 27. The pawl engages a notch 28 in the cam plate and is pressed into the notch by a spring 29. The pawl has a pin 30 in its other free end which is engaged by a spring 31. The cam plate 24 is provided with an eccentric groove 32 in its underside. In said groove moves a pin 33 which is carried by another pawl 34. The latter is pivoted at 35 and has a hole for the passage of the shaft 2. The left hand end of the pawl 34 in Fig.

2 carries a tooth 36 which engages ratchet 37 secured to the inside of a counting ring 38. It will be understood that when the cam plate 24 is rotated, the eccentric groove actuates the pin 33 to oscillate the pawl 34 on its pivot 35 to cause the tooth 36 to advance the ratchet 37 and the counting ring 38 one tooth. The counting ring is rotatably supported on an outer circular flange 39 which rises from the camera top plate 27. A second inner and higher circular flange 40 supports and engages a number of rollers 41 which act as braking means between the stationary flange 40 and the rotatable winding up knob 20 to prevent return movement of the latter. The aforesaid pawl 34 extends through the flange 40 in a suitable cut out. The flange is also recessed to provide space for the other pawl 25. The winding up knob 20 carries a Geneva stop movement 42 which engages a pin 43 in the bearing 19 to limit the winding movements of the springs in both directions as will be understood, see Fig. 4.

From the foregoing it will be seen that the springs 21 and 22 being secured to the knob 20 are wound up by rotation of said knob 20. The spring 22 in turn rotates the cam plate 24 and thereby the shaft 2. At the end of the winding up movement the cam plate 24 is held immovable by the pawl 25. During the winding up movement, the other pawl 34 operates the counting ring 38 to indicate the number of exposures. At this time the shutter has been rewound and the film advanced one picture length. The next exposure is made by operating the shutter release to open the shutter and at the same time operate parts of the rewinding mechanism to place the latter in condition for automatic rewinding of the shutter immediately following the exposure.

When the shutter release 15 is depressed to uncouple the clutch members 10 and 11 whereby to release the shutter in the usual manner it also depresses an arm 45, Fig. 5, which carries a stud 46. The releasing movement is to the right of Fig. 5. The latter tips down one end of a forked plate 47, Fig. 6, which is pivoted at 48, 48 to the top plate 27 of the camera. The right hand end of the plate 47, Fig. 6, carries two upstanding pins 49 and 50 which also appear in Fig. 2. When the stud 46 depresses one end of the plate 47, the other end with the two pins moves up. The pin 49 has a bevelled head which engages the cam plate pawl 25, Fig. 3, and moves it out of engagement with the cam plate, thereby releasing the latter from the pawl. The pin 30 on the cam plate pawl 25 is then engaged by the spring 31 to maintain the pawl in disengaged position with respect to the cam plate. At the same time the other pin 50 has also been moved up and now stands in front of the nose 51 on the cam plate, Fig. 2, and prevents rotation thereof during the exposure. A spring 44 keeps the plate 47 up against the stud 46.

When the operator lets go of the shutter release, the pins 49 and 50 drop. The cam plate is now completely released and is rotated, as is also the shaft 2, by the springs 21 and 22 to rewind the shutter and advance the film, the clutch members 10, 11 now being coupled. After half a revolution of the cam plate clockwise in Fig. 2, its nose 51 hits the pin 30 to release the pawl 25 from the spring 31. The pawl is then ready to enter the notch or recess 26 and stop rotation of the cam plate and shaft 2 and the camera is now ready for the next exposure. The shaft 2 is provided with the usual spring 53 which prevents return movement of the shaft after it has boon wound up in the event that the spring winding mechanism is made inoperative.

In operation therefore, the springs 21 and 22 having been wound up, the spring winding mechanism is held inoperative by the pawl 25 which engages the cam plate 24. When the operator desires to take a picture the shutter release is depressed to disengage the clutch members 10 and 11 so that the shutter may open in the usual manner and an exposure made. Simultaneously therewith the spring winding mechanism is released from the pawl 25 but also held by the pin 50. When the operator lets go of the shutter release the pin 50 drops, the cam plate is now released and the springs 21 and 22 act to rotate the shaft 2 whereby to wind up the shutter and the film. By longer exposures it may appen that the operator lets go of the release 15 before a long exposure is completed so that the automatic rewinding mechanism would commence premature operation. This apparent disadvantage is not of importance because the operator, after some experience, will not let go of the release before he hears the click which occurs when the second curtain snaps into finished shutter closed position after the exposure. On the other hand an automatic rewinding mechanism as herein disclosed is used mainly in connection with short exposures where one desires to take pictures in quick succession.

Figs. 7, 8 and 8 illustrate a device which may be incorporated in the winding up knob 20 for the purpose of operatively disconnecting the spring winding mechanism whenever desired. To this end there is connected to the knob 20 a coupling member 60 having a depending sleeve 61 provided with openings 62. Two dogs 63, 63 are pivoted on the bearing plate 19 in swingable relation to the knob 20. Springs 64 urge the dogs through the openings 62 into engagement with teeth 65 on the inside of the knob 20. When the coupling member 60 is moved into one certain position, the dogs 63 engage the teeth 65 so that when thereafter the knob is rotated the entire spring winding mechanism is also rotated, that is it is operatively disconnected or uncoupled as in Fig. 9. When the coupling member is turned into a certain other position, the dogs are retracted as in Fig. 8 and the spring winding mechanism is then again operatively connected to the camera.

Referring now to Figs. 10, 11 and 12 parts which are similar to those already described have the same reference numbers. In this construction there is a difference in the operation of the shutter release 15. It will be seen by referring back to Fig. 1 that the release 15 is moved down in one stroke to unclutch the clutch members 10 and 11, the down stroke being limited by the arm 45 movable within the nipple 70. In Fig. 10 the downward movement of the shutter release 15 is a two-step movement.

The gear 8, Fig. 11, carries a cam 76 which is adapted to move in under a tongue 77 on the forked lever 47 just before the end of each rotation of the cam plate to tip lever 47 and thereby raise the pin 50 into the path of the nose 51 whereby further rotation of the cam plate and the rewinding mechanism is stopped and the latter is uncoupled from the shutter. When the release 15 is depressed the clutch members 10—11 are unclutched and the shutter would ordinarily now open. But this is prevented by a mechanism arranged at the bottom of the curtains shaft 4, Figs. 10 and 12. To said shaft there is secured a disk 71 having a tooth 72 adapted to be engaged by a pawl 73 pivoted at 74 on a lever 75. The right hand end of said lever engages the release shaft 13, Fig. 10, the left hand end is pivoted at a remote point, not shown. When therefore the release shaft 13 is depressed, the said pawl lever 75 is tipped to move the pawl 73 down into the plane of rotation of the disk 72. The pawl engages the tooth 72 and prevents rotation of the curtains shaft 4 and prevents opening of the shutter. However, it will be noted from Fig. 12 that although the pawl 73 stops shutter opening rotation by the shaft 4, yet it does not prevent a very slight rotative movement of said shaft until the tooth 72 hits the pawl. This slight movement of the shaft permits sufficient movement of the first shutter curtain to eliminate the overlapping of the curtain edges. Hence, when the shutter is released, the exposure opening is formed immediately upon such operation. It is also clear that because of this slight movement of the shaft 4, the train of gears 16, 17 and 18 have a slight advance movement before the shutter is opened by the operator. When now after this interruption the operator continues the depression of the release shaft 13, the pawl lever 75 is moved down still further to bring the pawl 73 below the tooth 72, the curtains shaft 4 is now free to move and the shutter opens for an exposure. By comparing the operation of the construction shown in Figs. 10–12 with that shown in Figs. 1–6 it will be seen that when the release shaft 13 is depressed in Fig. 1, the shutter is uncoupled from the rewinding mechanism and opened to make an exposure, and that the releasing operation for exposure making purposes also involves the uncoupling of the pawl 25 from the cam plate 24 and the opening of the clutch 10—11. In Fig. 10 these operations are effected separately by the cam 76 at the beginning of the unwinding movement and the complete release by the operator in order to make an exposure only involves the slight action of tipping the lever 75 in order to release the curtains shaft 4. After the exposure the release shaft is moved up into normal position by the springs 14 and 44, the clutch members 10—11 are clutched together, the forked lever 47 is tipped by the spring 44 so that the pin 50 is lowered away from the cam plate nose 51 and the rewinding mechanism now starts to operate and rewinds the shutter. The object of the arrangement illustrated in Figs. 10–12 is to separate the direct shutter release action from the other adjacent mechanisms whereby to obtain a very smooth easy shutter release and elimination of the overlapping of the curtain edges.

Fig. 6 illustrates a release delaying mechanism 80 consisting of a number of gears in mesh with the gear 8 on the winding shaft 2.

While the features of the invention have been illustrated in separate views in the drawings, it will be understood that these features all form part of one invention and may all be incorporated into one structure.

It will further be noticed that the spring winding mechanism as incorporated into the camera mechanism is a very convenient embodiment and may readily be added to cameas not having this feature.

We claim:

1. In a roll film camera having a focal plane shutter and a shutter release held in normal shutter closed position, a shutter rewinding shaft and gears operatively connecting said shaft and shutter to rewind the shutter; an automatic rewinding mechanism for rotating said shaft after an exposure comprising a hollow rewinding knob, rewinding springs secured to said knob and operatively connected to said shaft to rotate the same, means within said knob for normally engaging said said shaft to hold the same against rotation, a member normally operatively disconnected from the rewinding mechanism and the shutter, means on said member for directly disconnecting said holding means from said shaft to release the shaft for rotation after an exposure and for directly simultaneously therewith operatively engaging said shaft to restrain the same from rotation during an exposure, means on the shutter release for actuating said member to cause the means thereon to operate as aforesaid when said release is operated, springs for returning the shutter release to normal position and for operating said member to release the said shaft for rotation by said rewinding springs and means for supporting said holding means within said hollow knob.

2. In a roll film camera having a focal plane shutter and a shutter release held in normal shutter closed position, a shutter rewinding shaft and gears operatively connecting said shaft and shutter for rewinding the shutter; an automatic rewinding mechanism for operating said rewinding shaft comprising a cam plate secured to the shaft, a hollow rewinding knob, rewinding springs secured to said hollow knob and said cam plate to rotate the latter and said shaft when said rewinding mechanism is released, a pawl engaging said cam plate to normally prevent rotation thereof by said springs, a pivoted lever normally operatively disconnected from the rewinding mechanism, two pins on said lever, a stud on the shutter release to actuate said lever when the release is operated to move one of said pins into engagement with said pawl to release said cam plate and rewinding shaft for rotation after an exposure and to move the other of said pins into engagement with the cam plate to restrain the same from rotation during an exposure, means for operating said shutter release to release the shutter and for simultaneously therewith moving said stud into engagement with said lever, springs for returning the shutter release and stud to normal positions and for operating said lever to release the cam plate and the rewinding shaft for rotation by said rewinding springs, the latter and the said cam plate and pawl being located wholly within said rewinding knob.

3. In a roll film camera having a focal plane shutter and a shutter release held in normal shutter closed position, a shutter rewinding shaft and gears operatively connecting said shaft and shutter to rewind the shutter; an automatic rewinding mechanism for rotating said shaft after an exposure comprising a hollow rewinding knob, rewinding springs operatively secured to said knob and shaft to rotate the latter, means within said knob normally engaging said shaft to hold the same against rotation, a member normally disengaged from the rewinding mechanism, means on said member for disconnecting said holding means from said shaft to release the shaft for rotation after an exposure and for simultaneously therewith operatively engaging said shaft to restrain the same from rotation during an exposure, a rotating cam for actuating said member to cause the means thereon to operate as aforesaid when the shutter release is operated, means for operating the shutter release, means for simultaneously therewith rotating said cam, means for momentarily interrupting the operation of the shutter release until said cam has completed its rotation whereby to separate the direct shutter release action from the operations aforesaid and springs for returning the shutter release and said member to normal positions to release the said shaft for rotation by said rewinding springs.

HELMUT BECKER.
HEINRICH BROSCHKE.
ERICH FILSINGER.